United States Patent
Azzarello et al.

(10) Patent No.: US 7,673,131 B2
(45) Date of Patent: Mar. 2, 2010

(54) BOOTING AN OPERATING SYSTEM IN DISCRETE STAGES

(75) Inventors: Patrick B. Azzarello, Issaquah, WA (US); Anil A. Ingle, Woodinville, WA (US); Richard A. Pletcher, Redmond, WA (US); Saad Syed, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 547 days.

(21) Appl. No.: 11/418,761

(22) Filed: May 5, 2006

(65) Prior Publication Data

US 2007/0260868 A1 Nov. 8, 2007

(51) Int. Cl.
*G06F 15/177* (2006.01)
(52) U.S. Cl. ........................................................ 713/2
(58) Field of Classification Search .................... 713/2, 713/1
See application file for complete search history.

(56) References Cited

U.S. PATENT DOCUMENTS

| | | | |
|---|---|---|---|
| 5,367,688 A * | 11/1994 | Croll | 713/2 |
| 6,128,734 A | 10/2000 | Gross et al. | 713/100 |
| 6,317,826 B1 * | 11/2001 | McCall et al. | 713/1 |
| 6,421,777 B1 * | 7/2002 | Pierre-Louis et al. | 713/2 |
| 6,678,712 B1 | 1/2004 | McLaren et al. | 709/100 |
| 6,687,820 B2 * | 2/2004 | French et al. | 713/2 |
| 6,810,478 B1 * | 10/2004 | Anand et al. | 713/2 |
| 6,941,518 B2 * | 9/2005 | French et al. | 715/736 |
| 6,961,941 B1 | 11/2005 | Nelson et al. | 719/319 |
| 7,299,354 B2 * | 11/2007 | Khanna et al. | 713/165 |
| 2003/0012114 A1 | 1/2003 | Larvoire et al. | 369/100 |

* cited by examiner

*Primary Examiner*—Thomas Lee
*Assistant Examiner*—Eric Chang
(74) *Attorney, Agent, or Firm*—Merchant & Gould, P.C.

(57) ABSTRACT

A computing device is configured to assemble and boot an operating system in stages. A primary boot image is first obtained that includes enough of the operating system to support basic networking. Once the primary boot image is obtained, either through download or from storage on the device, the primary boot image is booted to start the networking. Once the networking is active, the boot activity for the device is suspended and one or more secondary operating system images are downloaded by the device. These images are chained to the primary boot image thereby creating a single/cohesive operating system. These secondary operating system images are successively booted in "stages" with each successive stage building upon the functionality of the previous stage.

20 Claims, 4 Drawing Sheets

BOOTING AN OPERATING SYSTEM IN DISCRETE STAGES

BACKGROUND

Storage is a precious resource on embedded systems. Many embedded devices do not include hard drives as they are expensive and are many times the first major component to fail. Hard drive replacement may also be costly due to the cost of imaging a new drive as well as the disassembling and the reconfiguring required for the device. As such, many embedded devices require booting through a network boot mechanism. The Intel Pre-Boot Execution Environment (PXE) standard is commonly used, but it has very limited network platform and authentication support.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computing device is configured to assemble and boot an operating system in stages using discrete operating system images. Each subsequent image of the operating system that is obtained builds upon the last image and when the operating system images are combined they create a complete operating system. A primary boot image is first obtained for the device that includes enough of the operating system to support basic networking capabilities. Once the primary boot image is obtained, either through download or from local storage on the device, the primary boot image is booted to start the networking client. Once the networking client is active, the boot activity for the device is suspended. This provides an opportunity to authenticate the client, server and possibly user, and then one or more secondary operating system images are downloaded by the device using a richer network platform provided by the primary boot image. These secondary operating system images are chained to the primary boot image thereby creating a single/cohesive operating system. These secondary operating system images each build upon the functionality of the previous stage.

DETAILED DESCRIPTION

Figure 1:
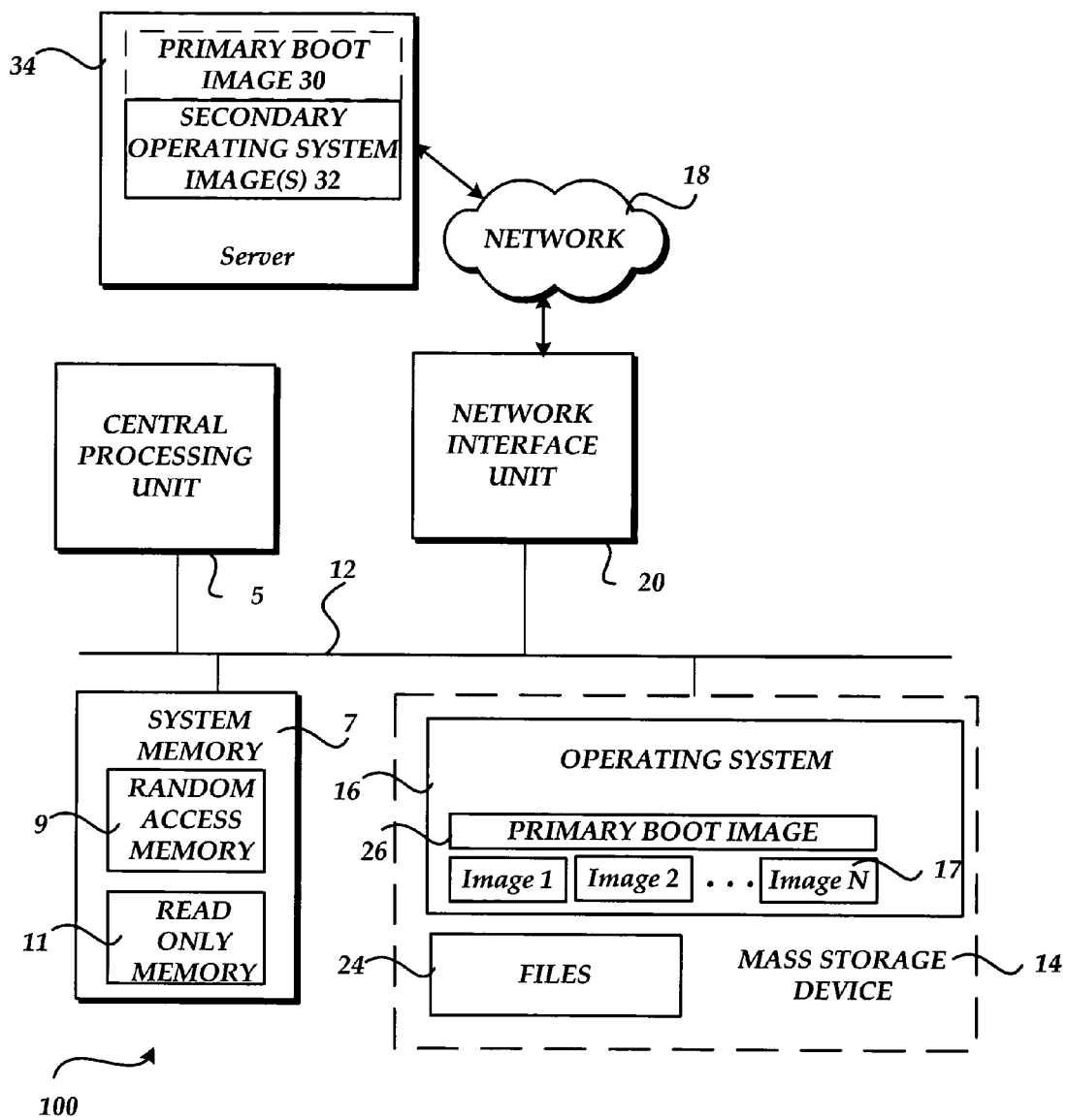
FIG. 1 illustrates an exemplary computing architecture that includes an operating system that is booted in discrete stages.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described that includes an operating system that is booted in discrete stages. The computer architecture shown in FIG. 1 may be configured as a mobile computing device and/or a conventional computing device. For example, computing device 100 may be configured as a smart phone, a PDA, a desktop computer, a server, a tablet, a laptop computer, and the like. Computing device 100 may also be configured as an embedded computing device.

As illustrated, computer 100 includes a central processing unit 5 ("CPU"), a system memory 7, including a random access memory 9 ("RAM") and a read-only memory ("ROM") 11, and a system bus 12 that couples the memory to the CPU 5. System memory 7 may be any combination of non-volatile memory and volatile memory. A basic input/output system containing the basic routines that help to transfer information between elements within the computer, such as during startup, is stored in the ROM 11. The computer 100 may include a mass storage device 14 for storing an operating system 16 that comprises (once obtained) a primary boot image 26 and one or more secondary operating system images 34.

Operating system 16 is booted in stages. At startup of device 100, a primary boot image 26 may be retrieved from storage on device 100 or it may be downloaded from a network location, such as from server 34. For example, the primary boot image 30 may be obtained from server 34 by utilizing the PXE standard to download the primary boot image 30. The primary boot image includes enough of the operating system 16 to support basic networking. Once the primary boot image is obtained, either through download or from storage on the device, the primary boot image 26 is booted on device 100 to start the networking for device 100.

Once the networking client on device 100 is active, the boot activity for device 100 is suspended and one or more secondary operating system images 32 are downloaded by the device (34). Each secondary operating system image of the operating system 16 that is obtained builds upon the last operating system image that has been received. These secondary operating system images 17 are chained to the primary boot image 26 to create a single/cohesive operating system 16. According to one embodiment, the operating system images (17 and 26) are stored as separate images on mass storage device 14 but appear to applications on device 100 as a single cohesive file system (See FIG. 2 and related discussion). Operating system 16 may be configured to successively continue to boot each operating system image after it is chained with the previous image. Alternatively, any combination of operating system images may be chained and then the boot phase is continued. Each successive operating system image builds upon the functionality of the previous operating system image. While other devices may boot an operating system in stages they do not use the same operating system throughout the process. Generally, these systems perform the critical functionality in the BIOS or a secondary operating system to initially boot the device and then replace that functionality with a replacement operating system.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk, DVD drive or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, the computer 100 may operate in a networked environment using logical connections to remote computers through a network 18, such as the Internet. The computer 100 may connect to the network 18 through a network interface unit 20 connected to the bus 12. The network interface unit 20 may also be utilized to connect to other types of networks and remote computer systems. The connection may be a wired and/or wireless connection.

As mentioned briefly above, a number of program modules and data files may be stored in the memory of the computer 100, including an operating system 16 suitable for controlling the operation of a computing device. The computing device 100 may be an embedded system that includes an embedded operating system as well as other embedded data, files and applications.

According to one embodiment, all or some of the memory may be FLASH memory, or some other suitable memory for embedded systems. The mass storage device 14 and RAM 9 may also store one or more program modules.

Figure 2:
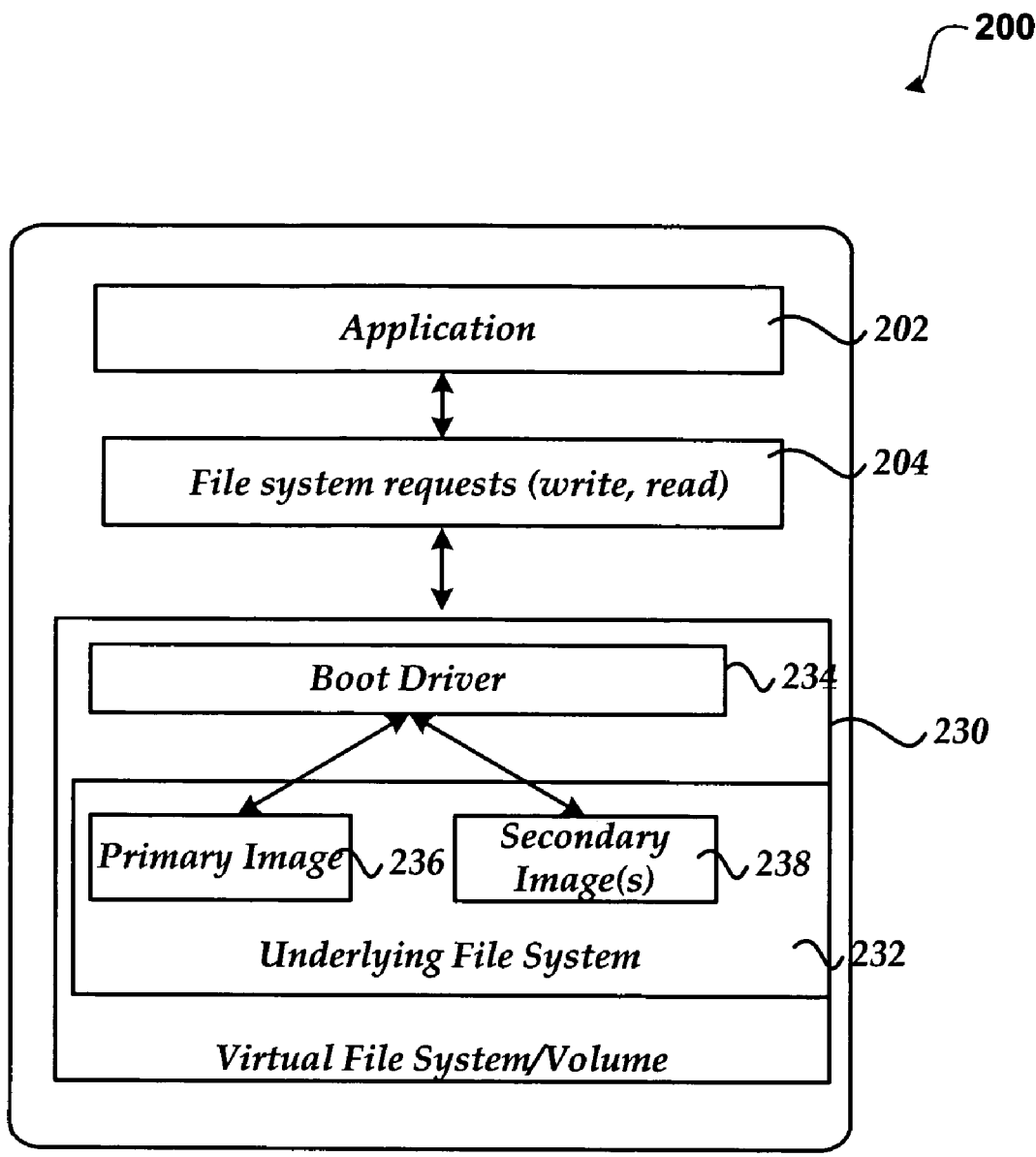
FIG. 2 shows an exemplary file system that is configured to support booting an operating system in discrete stages.

FIG. 2 shows an exemplary file system that is configured to support booting an operating system in discrete stages. As illustrated, file system 200 includes application 202, file system requests 204, virtual file system 230 that comprises boot driver 234 and underlying file system 232 comprising primary image 236 and secondary image(s) 238.

When an application 202 requests data to be read or written from an attached volume through a file system request 204, the request is passed to the virtual file system 230 implemented by the boot driver 234.

Boot driver 234 allows the operating system images (primary image 236 and secondary image(s) 238) to be viewed as a cohesive file system by any application, such as application 202. Each operating system image (primary image 236 and secondary image(s) 238) that is stored independently as separate files may be loaded as an overlay and appear to the system as a single set of files within virtual file system 230. The operating system images may be stored in underlying file system 232 and/or in RAM in which case boot driver 234 accesses the operating systems directly from memory.

According to one embodiment, when loading an image of the complete operating system, boot driver 234 loads each of the operating system images that are present within the RAM and/or underlying file system and chains the operating system images. Chaining the primary boot image 236 with the secondary operating system image(s) 238 allows the operating system to boot from multiple files. According to one embodiment, boot driver 234 examines configuration information to identify the appropriate operating image to initially boot from. If the configuration information is not available, or not found, the boot driver 234 looks for a boot file at the root level of the underlying file system 232. As discussed above, primary image 236 is configured to provide a minimal set of network functionality such that secondary image(s) 238 may be obtained using standard networking protocols.

Figure 3:
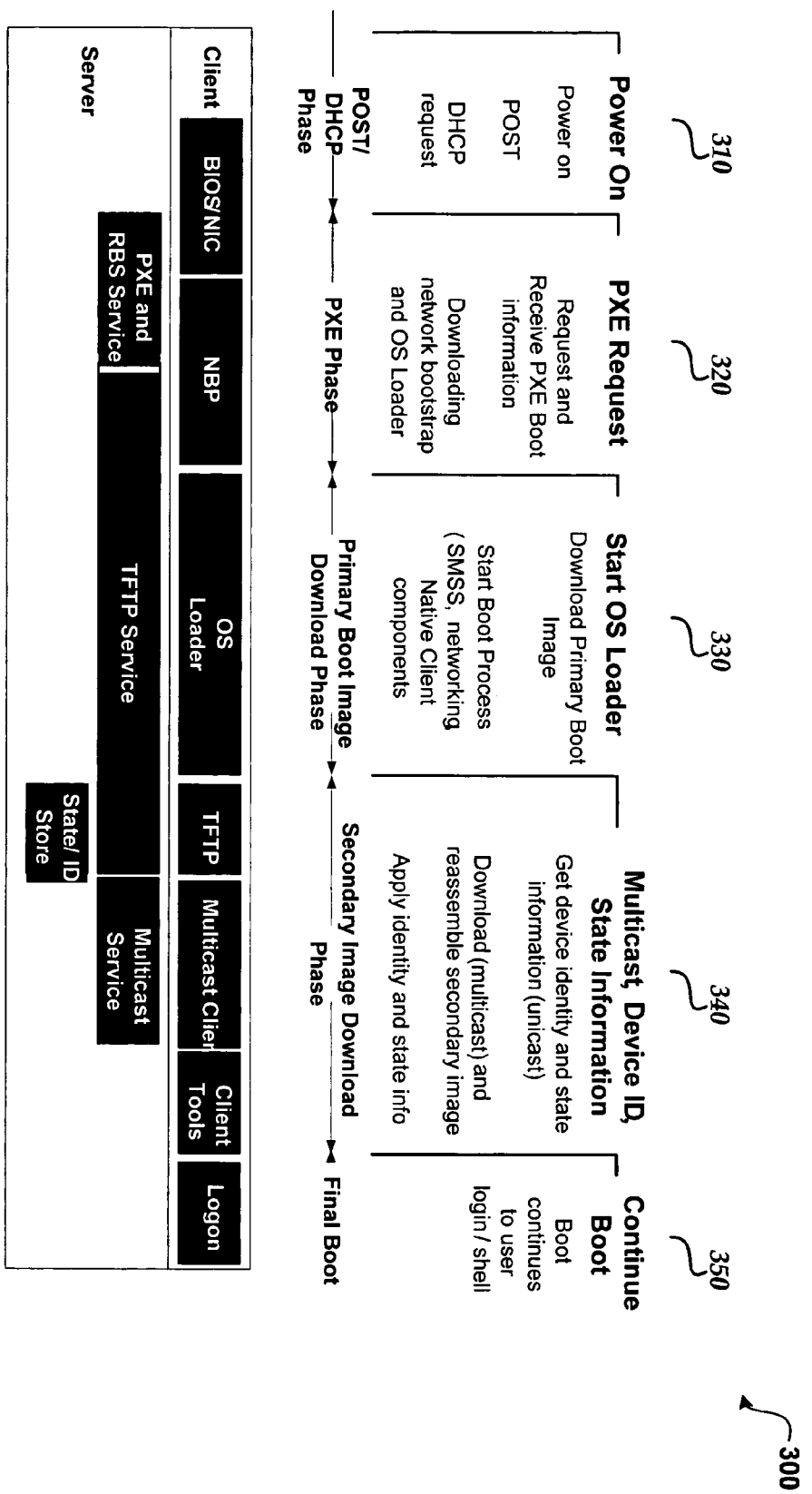
FIG. 3 shows a phased timeline for booting a device in discrete stages.

FIG. 3 shows a phased timeline for booting a device in discrete stages. As illustrated, the timeline is divided into a POST/DHCP phase 310, a PXE phase 320, a primary boot image download phase 330, a secondary image download phase 340, and a final boot phase 350. Each phase of the process is marked by a specific event along with a basic description of tasks and events identified within each phase.

According to one embodiment, after the device is powered on, a Power On Self Test (POST) runs. According to one embodiment, when the POST completes, the network interface card (NIC) of the device sends a DHCP discovery message to obtain an IP address for the device. The DHCP request includes information to request PXE boot information as well as to request the location of a PXE server.

During the PXE Phase 320, the device requests and receives the PXE boot information and downloads the network bootstrap and the operating system loader, such as OS Loader. Other boot configuration data and information may also be obtained. For example, the location of the primary boot image, whether to download the primary boot image from a server or obtain it from a local mass storage device may be obtained. As discussed above, the primary boot image may be stored on the device. When the primary boot image is stored on the device, the PXE phase 320 and the primary boot image download phase 330 may be skipped. When the device does not already include the primary boot image, the device sends the PXE request to the server.

According to one embodiment, TFTP is used to download the PXE bootstrap program (startrom), operating system loader (OS Loader), boot configuration data and other files as designated in the PXE response. Once these components are downloaded, the process moves to the primary boot image download phase 330 where the device loads the OS Loader, which according to one embodiment: creates a RAM disk and downloads a primary boot image using TFTP, and puts that image in the RAM disk.

The OS Loader begins the boot process and uses a unicast (TFTP) protocol to download the primary boot image. Once downloaded, these basic operating system components including a kernel, a networking client, drivers, etc., get loaded by the device.

The primary boot image provides more functionality before the complete operating system is loaded. According to one embodiment, the primary boot image components include: RAM disk management; Multicast client; Device Identity Application; and State application. During the primary boot image download phase 330, the definition for the remaining operating system image is downloaded, the RAM disk is resized to accept the secondary image(s), and any device identity/state packages are downloaded (using a unicast protocol for efficiency).

According to one embodiment, the native multicast client is then started, and a request is sent to the multicast server. If the multicast server is not "broadcasting", it will begin broadcasting the appropriate secondary image(s). If it is already broadcasting secondary operating system images, it queues up the requested image for this client. The device then begins to "listen" for the multicast broadcast, accepts data that is specified in the image definition, and reassembles or processes the secondary image into the RAM disk. When reassembly is complete, device identity and state information are applied, and the boot process for the device is resumed. Alternatively, the operating system images may be obtained using the unicast protocol. The secondary operating system image (s) are downloaded to enhance the functionality of the operating system by moving from a lightweight, generic networking operating system to a fully configured operating system, such as a MICROSOFT WINDOWS® operating system by MICROSOFT CORPORATION of Redmond, Wash.

In the Final Boot Phase 350, the boot process continues using the same operating system base that was used in the bootstrap step without requiring a reboot of the system.

Figure 4:
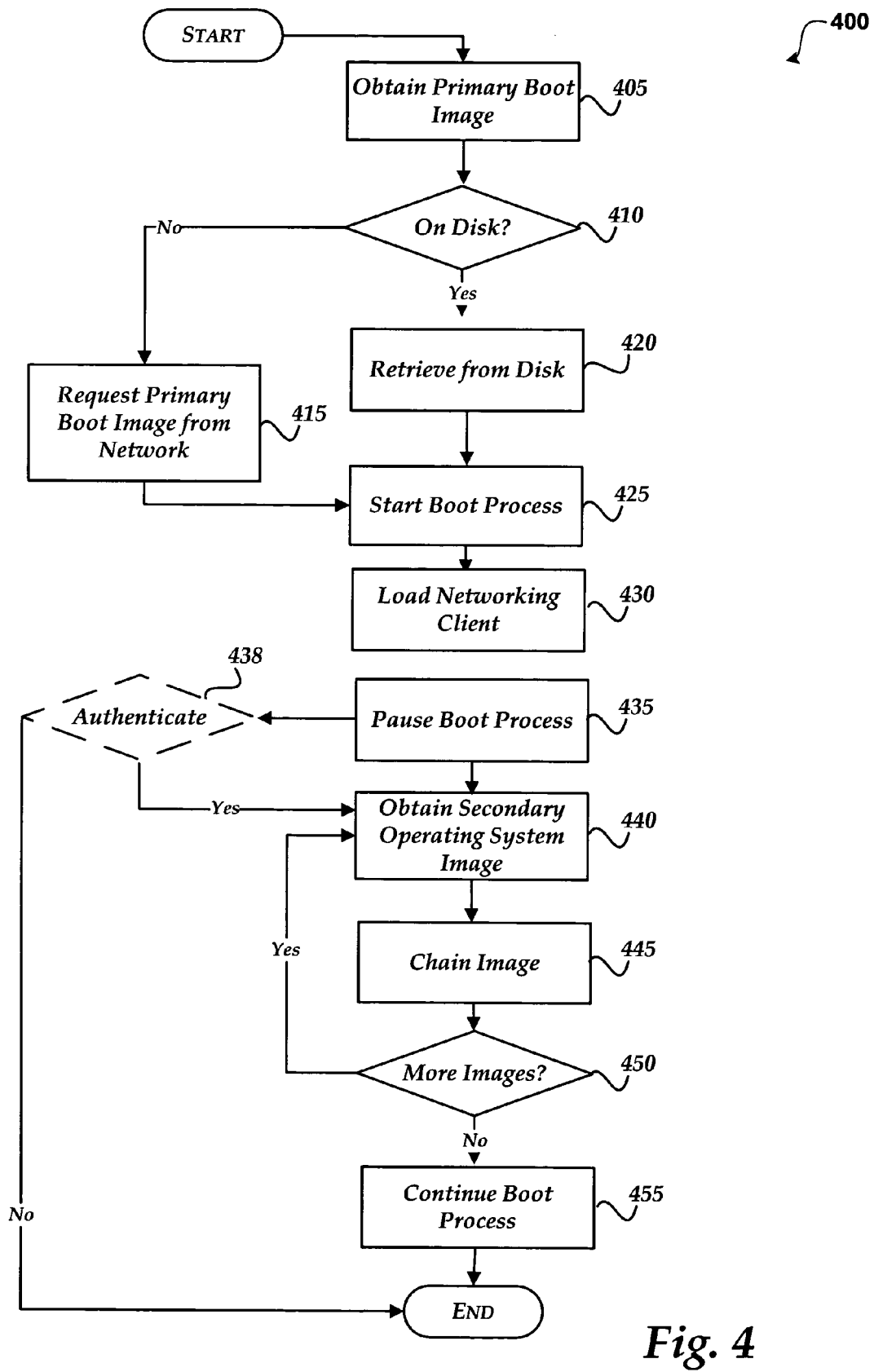
FIG. 4 shows a process for booting an operating system in discrete stages.

Referring now to FIG. 4, an illustrative process for booting an operating system in discrete stages will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

FIG. 4 shows a process 400 for booting an operating system in discrete stages. After a start operation, the process moves to operation 405 where the primary boot image is obtained. Decision block 410 determines whether the primary boot image is stored on disk or whether the primary boot image is stored at a network location.

When the primary boot image is stored on a disk, or within another memory location of the device, the process moves to operation 420 where the primary boot image is obtained from the device.

When the primary boot image is stored at a network location, the process moves to operation 415 where the primary boot image is obtained from the network location. As discussed above, the primary boot image includes enough networking capabilities to instantiate a network client on the device. Once the primary boot image is obtained, the boot process is started at operation 425.

During the initial booting of the device, the networking client is loaded at operation 430. Once the networking client is loaded the boot process for the device is paused at operation 435. The process may move to authentication operation 438 which provides an opportunity to authenticate one or more of: the client, a server and the user. Failure to authenticate one of the above may cause the boot process to be aborted. When the device is authenticated, the boot process continues to operation 440 so that one or more secondary operating system images may be obtained. The secondary image(s) provide more functionality to the operating system. The networking client may use secure protocols to download the secondary image(s) as well as providing multicast support.

Transitioning to operation 445, the recently obtained secondary operating system image is chained to the previous image. In the case where the first secondary operating system image is obtained it is chained to the primary boot image. The chaining of the images creates a logical image of a single operating system as discussed above with regard to FIG. 2.

Flowing to decision block 450 a determination is made as to whether there are any more secondary operating system images to obtain. The operating system may comprise any number of secondary operating system images. For example, one complete operating system may include two secondary operating system images while another complete operating system may include three or more secondary operating system images.

When there are no more secondary operating system images to load and chain the process flows to continue operation 455 where the boot process is continued to add the functionality of the newly chained operating system images. Although continue process 455 is illustrated after all of the secondary operating system images are obtained, the boot process may alternatively be continued after each secondary image is obtained. The process then moves to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for booting an operating system in discrete stages on a device, comprising:
   obtaining a primary boot image;
   starting a boot process of the device using the primary boot image;
   pausing the boot process;
   obtaining a secondary operating system image that builds upon the primary boot image;
   chaining the secondary operating system image to the primary boot image such that the primary boot image and the secondary image comprise the operating system; and
   continuing the boot process.

2. The method of claim 1, wherein obtaining the primary boot image comprises obtaining the primary boot image from either a storage on the device or from a network location.

3. The method of claim 2, wherein obtaining the primary boot image from the network location comprises using an Intel Pre-Boot Execution Environment (PXE) standard.

4. The method of claim 1, wherein obtaining the secondary boot image comprises loading a networking client and using the networking client to obtain the secondary boot image from a network location.

5. The method of claim 1, further comprising pausing the booting of the device when the network client is loaded and performing an authentication operation.

6. The method of claim 5, further comprising continuing the booting when the secondary operating system image is chained to the primary boot image.

7. The method of claim 6, wherein the primary boot image and the secondary operating system image are maintained as separate files on the device in an underlying file system.

8. The method of claim 7, wherein using the network client to obtain the secondary operating system image comprises using a multicast protocol.

9. An apparatus that includes an operating system that is booted in discrete stages, comprising:
   a processor and a computer-readable medium;
   a network interface unit; and
   an operating environment stored on the computer-readable medium and executing on the processor and that is configured to obtain a primary boot image that includes a network client that is configured to interface with the network interface unit; and wherein the network client is configured to download a secondary operating system image; and wherein the network client is configured to download a third operating system image; wherein the primary boot image and the secondary operating system image and the third operating system image are chained to form the operating system; wherein a boot process for the apparatus is paused between each download of the second operating system image and the third operating system image.

10. The apparatus of claim 9, wherein the operating environment is configured to load the primary boot image from the computer-readable medium and begin the boot process of the device using the primary boot image.

11. The apparatus of claim 10, further comprising pausing the booting of the device after the network client is loaded and before the secondary operating system is obtained.

12. The apparatus of claim 11, further comprising chaining the secondary operating system image to the primary boot image.

13. The apparatus of claim 12, further comprising a boot driver that is configured to interact with the primary boot image and the secondary operating system image.

14. The apparatus of claim 13, wherein obtaining the secondary operating system image from the network comprises using a multicast protocol.

15. The apparatus of claim 9, wherein the operating environment is configured to obtain the primary boot image from a network location using the network interface unit.

16. The apparatus of claim 15, wherein obtaining the primary boot image from the network location comprises using an Intel Pre-Boot Execution Environment (PXE) standard with the network interface unit.

17. A computer-readable medium having computer executable instructions for booting an operating system for a device in discrete stages, the instructions comprising:
    obtaining a primary boot image;
    beginning a boot process of the device to load a network client;
    starting the network client;
    pausing the boot process of the device;
    downloading a secondary operating system image;
    chaining the primary boot image with the secondary image to form a portion of the operating system; and
    downloading and chaining one or more additional secondary operating system images, such that the primary boot image and the secondary images comprise the operating system; and resuming the boot process.

18. The computer-readable medium of claim 17, further comprising obtaining the primary boot image from one of: a storage on the device and a network location.

19. The computer-readable medium of claim 18, wherein the primary boot image and the secondary operating system image are maintained as separate files on the device but appear to an application as a single file system.

20. The computer-readable medium of claim 19, wherein obtaining the primary boot image utilizes a unicast protocol and obtaining the secondary boot image utilizes a multicast protocol.

* * * * *

UNITED STATES PATENT AND TRADEMARK OFFICE
CERTIFICATE OF CORRECTION

| | | |
|---|---|---|
| PATENT NO. | : 7,673,131 B2 | Page 1 of 1 |
| APPLICATION NO. | : 11/418761 | |
| DATED | : March 2, 2010 | |
| INVENTOR(S) | : Patrick B. Azzarello et al. | |

It is certified that error appears in the above-identified patent and that said Letters Patent is hereby corrected as shown below:

In column 8, line 13, in Claim 17, after "system;" delete "and".

Signed and Sealed this
Seventeenth Day of May, 2011

David J. Kappos
*Director of the United States Patent and Trademark Office*